United States Patent [19]

Lofgren

[11] Patent Number: 4,654,388

[45] Date of Patent: Mar. 31, 1987

[54] LATEX ADHESIVES FOR FLOOR LAYING

[75] Inventor: Per-Erik Lofgren, Haelsingborg, Sweden

[73] Assignee: USM Corporation, Flemington, N.J.

[21] Appl. No.: 766,933

[22] Filed: Aug. 19, 1985

[30] Foreign Application Priority Data

Aug. 17, 1984 [DK] Denmark .............................. 3960/84

[51] Int. Cl.⁴ ........................... C08L 3/04; C09K 5/06
[52] U.S. Cl. .................................... 524/272; 524/270; 524/271; 524/376
[58] Field of Search ................. 524/270, 272, 376, 271

[56] References Cited

U.S. PATENT DOCUMENTS

| | | | |
|---|---|---|---|
| 3,838,079 | 9/1974 | Kosaka et al. | 524/272 |
| 4,018,732 | 4/1977 | Lakshmanan | 524/272 |
| 4,143,019 | 3/1979 | Burley | 524/376 |
| 4,503,184 | 3/1985 | Marongiu | 524/270 |
| 4,532,273 | 7/1985 | Kadowaki et al. | 524/271 |
| 4,590,230 | 5/1986 | Kamada et al. | 524/272 |

Primary Examiner—Herbert S. Cockeram
Attorney, Agent, or Firm—Thomas S. Szatkowski

[57] ABSTRACT

An adhesive composition comprising an aqueous dispersion of film forming resin, filler and tackifying substances. The dispersion uses wood rosin and esterified rosin as tackifying substances and also includes diethylene glycol monobutyl ether. The compositions are specially formulated to avoid use of the more volatile organic solvents which are undesirable for flammability or health reasons. The compositions are particularly suitable for use as nonflammable floor laying adhesives by methods in which porous flooring material is laid onto the wet adhesive layer or non-porous flooring material is laid onto the "semi-dry" adhesive layer.

12 Claims, No Drawings

LATEX ADHESIVES FOR FLOOR LAYING

BACKGROUND OF THE INVENTION

This invention is concerned with improvements in or relating to adhesive compositions free of volatile solvents.

In the field of adhesive compositions there is a persistent desire to provide adhesive compositions free of volatile solvents for various reasons. For example, volatile solvents commonly used in the adhesives trade are inflammable materials, and also some of them are regarded as undesirable or unsatisfactory for health reasons.

One approach to reduction in the amounts of volatile solvent used is to provide adhesive compositions in the form of aqueous dispersions or emulsions. Available compositions of this type are suitable for a variety of purposes where removal of the aqueous medium can be achieved without significant problems. For example, aqueous based adhesive compositions are known which comprise a dispersion of film forming resin (for example an acrylic copolymer) finely divided filler, tackifying substance and optionally thickeners and wetting agents. These known compositions have found application as flooring adhesives. While such adhesives perform their adhesive function satisfactorily, some contain minor amounts of volatile organic solvents, which become objectionable in the atmosphere when applied films of the adhesives are drying.

It is one of the various objects of this invention to provide an adhesive composition which is totally free of the more volatile organic solvents.

Adhesives for securing flooring materials for example PVC flooring materials are required to have a combination of properties to facilitate their use in so-called one way methods of bonding. These adhesive compositions are normally applied to a floor, and flooring material applied thereto. In the case of absorbant flooring materials, for example textiles, the flooring is usually applied to the layer of adhesive while the layer is wet, whereas in the case of nonporous flooring materials it is usual to allow the adhesive layer to dry out to a so called "semi-dry" condition in which the layer is pressure sensitive prior to application of the flooring material. Thus, the composition is required to be capable of application to the floor to provide a layer of adhesive in a desired pattern and to be capable of displaying adhesion to flooring material surfaces which may be pervious to water, and of displaying pressure sensitive properties to impervious substrates.

Resins used in aqueous dispersion adhesive compositions frequently have insufficient tack for pressure sensitive applications and require use of tackifying agents. However, in order to incorporate tackifying resins without generating instability of the composition it is usual practice to add them to the composition as a solution in low boiling organic solvents, which in turn gives rise to objections in relation to flammability, toxicity and/or odor. When it is desired to use no low boiling solvent whatsoever, one has to ensure that the tackifying substances used confer desired properties but do not lead to instability of the dispersion.

SUMMARY OF THE INVENTION

The present invention provides in one embodiment an adhesive composition free of volatile organic solvent and comprising an aqueous dispersion of film forming resin, finely divided filler, tackifying substance, and optionally thickeners and wetting agents characterized in that the dispersion contains diethylene glycol monobutyl ether and as tackifying substance there is used a mixture of wood rosin and esterified rosin.

DETAILED DESCRIPTION OF THE PREFERRED EMBODIMENT

An adhesive composition according to the invention contains no volatile organic solvent i.e. no organic solvent having a boiling point less than 200° C. and accordingly gives rise to no objections with respect to flammability or toxic properties of such organic solvents. Also an adhesive composition according to the invention is a stable dispersion capable of use as a floor laying adhesive to bond various PVC flooring materials e.g. homogenous plasticized PVC, foamed, supported PVC, etc. to various floorings e.g. concrete, asphalt, wood.

Compositions according to the invention have a solids content and viscosity appropriate to their intended use. Preferred compositions have a viscosity in the range 400 to 800 poise and suitably contain from 50 to 75% total solids.

An adhesive composition according to the invention comprises a film forming resin. Conveniently the film forming resin is employed to provide from 20% to 50% by weight resin in the composition, and preferably is employed to provide from 30% to 40% by weight of the composition. Suitable film forming resins which may be used alone or in admixture include acrylic materials for example copolymers of butylacrylates, 2-ethylhexyl acrylate and vinylacetate. Suitable film forming resins which may be used alone or in admixture also include copolymers of ethylene with for example vinyl acetate, ethyl acrylate and the like, and styrene butadiene copolymers. The film forming resin is preferably obtained as an aqueous emulsion containing minor amounts of emulsifiers and stabilizers, and suitably has a pH in the range 4 to 6. Preferably the film forming resin comprises a mixture of resins. Preferred mixtures comprise an acrylic copolymer and an ethylene vinyl acetate copolymer. Preferably these are used in a weight ratio of acrylic copolymer: ethylene vinyl acetate copolymer in the range 2:1 to 8:1.

An adhesive composition according to the present invention comprises as tackifying substance a mixture of wood rosin, and esterified rosin. The rosins are chosen for their compatibility with each other and with other ingredients of the composition. Suitable wood rosin products have an acid number of about 163 and a softening point (Ring and Ball) of about 73° C. Suitable esterified rosins include pentaerythritol-wood rosin esters and the esters of pentaerythritol or glycerine with hydrogenated rosin or highly stabilized rosin as well as hydroabietyl phthalate. Preferred rosin esters have an acid number in the range of about 5 to about 20, and consistency ranging from viscous liquids up to solid with a softening point at 80° C. The wood rosin and esterified rosin are preferably employed in a ratio of from 3 to 8 parts by weight esterified rosin to one part by weight wood rosin i.e. a ratio of 1:3 to 1:8 wood rosin to esterified rosin. Preferably the wood rosin and esterified rosin are used in amounts to provide a ratio of film forming resin to tackifying substance in the range 3:1 to 6:1 by weight. The tackifying substance is suitably added to the dispersion as a solution in diethylene glycol monobutyl ether, which serves as a solvent for the tackifying resins. The ester is however, substantially nonvolatile under usual conditions for use of the adhesive compositions, and serves also as a coalescing agent for the dispersion and as a plasticizer in the adhesive film.

An adhesive composition according to the invention contains finely divided filler which confers flow controlling properties on the dispersion and is also desirable in the layer of adhesive. Suitable fillers include chalks and dolomites. The finely divided filler material may be used in any suitable quantity for example 5 to 50 parts by weight of the composition. We prefer to employ between 10 and 40 parts by weight finely divided filler in a composition according to the invention.

If desired, an adhesive composition according to the invention may include thickening agents to influence the flow characteristics of the composition under application conditions, for example carboxymethyl cellulose, hydroxyethyl cellulose, acrylates, and polyurethanes. Wetting agents and stabilizers may also be added to the composition to ensure stability of the dispersion.

In order that the invention may become more clear there now follows a description of one example adhesive composition, and its method of use, which is provided by the invention and illustrative thereof. It is to be understood that this illustrative composition, and its method of use have been selected for description to illustrate the invention by way of example only and not by way of limitation thereof.

EXAMPLE

The illustrative composition comprised an aqueous dispersion of materials mixed according to the following formulation:

| Ingredients | Amount by weight |
| --- | --- |
| Acrylic dispersion comprising 55% solids in water | 60 |
| Ethylene vinyl acetate dispersion comprising 55% solids in water | 10 |
| Finely divided filler | 10 |
| Diethylene glycol monobutyl ether | 2 |
| Thickeners and wetting agents | 1 |
| Wood rosin | 1.5 |
| Esterified rosin | 7.5 |

The acrylic dispersion used as Acronal V 302. supplied by BASF and understood to be a terpolymer (Butyl acrylate, 2 ethyl-hexylacrylate, vinyl acetate). The ethylene vinyl acetate dispersion used was Vinnapas EP 400. The finely divided filler used was dolomite. The esterified rosin used was triethylene glycol ester of rosin.

The illustrative composition was a nonflammable, off white, thixotropic adhesive suitable for application with serrated trowel or roller. The performance of this adhesive in comparison with that of a commercial adhesive containing solvent can be seen from the following peel strength values yielded by test specimens formed by a one-way wet method between plasticized PVC and plywood.

|  | Peel strength after 7 days at RT |
| --- | --- |
| Commercial adhesive containing solvent | 92–99 N/5 cm |
| Illustrative composition (i.e. without solvent) | 96–103 n/5 cm |

In a typical method of using the illustrative composition for floor laying by a one-way wet method, by means of a serrated trowel the adhesive is applied in amount 200 g/m$^2$, to the floor which may be of concrete, wood etc. After an open drying time of approximately 15 minutes, the floor material is manually pressed down in the still wet adhesive.

I claim:

1. An adhesive composition, free of volatile organic solvent of boiling point less than about 200° C., comprising an aqueous dispersion of film-forming resin, finely divided filler, diethylene glycol monobutyl ether, and, as a tackifying substance, a mixture of wood rosin and esterified rosin.

2. An adhesive composition, free of volatile organic solvent of boiling point less than about 200° C., comprising an aqueous dispersion of film-forming resin, finely divided filler, diethylene glycol monobutyl ether, and, as a tackifying substance, a mixture of wood rosin and esterified rosin in a weight ratio of about 1:3 to about 1:8 by weight, said mixture present in quantities to provide a weight ratio of film-forming resin to tackifying substance of about 3:1 to about 6:1.

3. A composition according to claim 1 further comprising a thickener and a wetting agent.

4. A composition according to claim 2 further comprising a thickener and a wetting agent.

5. A composition according to claim 1 wherein the film-forming resin comprises an acrylate copolymer.

6. A composition according to claim 2 wherein the film-forming resin comprises an acrylate copolymer.

7. A composition according to claim 1 wherein the film-forming resin comprises an ethylene vinyl acetate copolymer.

8. A composition according to claim 2 wherein the film-forming resin comprises an ethylene vinyl acetate copolymer.

9. A composition according to claim 1 wherein the film-forming resin comprises a mixture of an acrylate copolymer and an ethylene vinyl acetate copolymer in a ratio of about 2:1 to about 8:1.

10. A composition according to claim 2 wherein the film-forming resin comprises a mixture of an acrylate copolymer and an ethylene vinyl acetate copolymer in a ratio of about 2:1 to about 8:1.

11. A composition according to claim 1 containing about 50–75 weight percent solids.

12. A composition according to claim 2 containing about 50–75 weight percent solids.

* * * * *